United States Patent
Liu et al.

(10) Patent No.: US 10,565,317 B1
(45) Date of Patent: Feb. 18, 2020

(54) APPARATUS FOR IMPROVING RESPONSES OF AUTOMATED CONVERSATIONAL AGENTS VIA DETERMINATION AND UPDATING OF INTENT

(71) Applicant: MOVEWORKS, INC., Fremont, CA (US)

(72) Inventors: Zhan Liu, Mountain View, CA (US); Jiang Chen, Fremont, CA (US)

(73) Assignee: Moveworks, Inc., Fremont, CA (US)

( * ) Notice: Subject to any disclaimer, the term of this patent is extended or adjusted under 35 U.S.C. 154(b) by 0 days.

(21) Appl. No.: 16/404,753

(22) Filed: May 7, 2019

(51) Int. Cl.
| | |
|---|---|
| *G06N 99/00* | (2019.01) |
| *G06F 16/2457* | (2019.01) |
| *G06F 3/0484* | (2013.01) |
| *G06F 16/332* | (2019.01) |
| *G06F 17/28* | (2006.01) |
| *G06N 20/00* | (2019.01) |
| *H04L 12/58* | (2006.01) |
| *G06F 17/27* | (2006.01) |

(52) U.S. Cl.
CPC ...... *G06F 17/2881* (2013.01); *G06F 17/2785* (2013.01); *G06N 20/00* (2019.01); *H04L 51/02* (2013.01); *G06F 3/0484* (2013.01); *G06F 16/2457* (2019.01); *G06F 16/3329* (2019.01); *G06N 99/00* (2013.01)

(58) Field of Classification Search
CPC ... G06N 99/00; G06F 16/2457; G06F 3/0484; G06F 16/3329
USPC .................................................... 704/235
See application file for complete search history.

(56) References Cited

U.S. PATENT DOCUMENTS

| | | | |
|---|---|---|---|
| 6,523,026 B1 | 2/2003 | Gillis | |
| 7,006,969 B2 | 2/2006 | Atal | |
| 7,403,890 B2 | 7/2008 | Roushar | |
| 9,037,464 B1 | 3/2015 | Mikolov | |
| 2015/0348549 A1* | 12/2015 | Giuli | G06F 16/3329 704/235 |
| 2017/0293660 A1 | 10/2017 | Nachlieli | |
| 2019/0164064 A1* | 5/2019 | Li | G06F 16/2457 |
| 2019/0215249 A1* | 7/2019 | Renard | G06F 3/0484 |
| 2019/0228070 A1* | 7/2019 | Lu | G06N 99/00 |

\* cited by examiner

*Primary Examiner* — Farzad Kazeminezhad

(74) *Attorney, Agent, or Firm* — Kanika Radhakrishnan; Evergreen Valley Law Group

(57) ABSTRACT

Embodiments provide methods and apparatus for improving responses of automated conversational agents. The method includes generating a vector representation of a conversational input provided by a user. The vector representation is used to determine an intent of the conversational input. Further, annotators generate bait sentences that cover multiple aspects of the intent. Then, sentences in a data pool are accessed. The bait sentences and the data pool sentences are converted into a first and a second set of vector representations, respectively. The first and the second set of vector representations are compared to retrieve a list of similar sentences. The list of similar sentences includes one or more sentences of the data pool that are semantically similar to the bait sentences. The list of similar sentences is analyzed for updating the intent data and thereby improve the responses.

16 Claims, 10 Drawing Sheets

APPARATUS FOR IMPROVING RESPONSES OF AUTOMATED CONVERSATIONAL AGENTS VIA DETERMINATION AND UPDATING OF INTENT

TECHNICAL FIELD

The present disclosure relates to natural language processing and, more particularly to, methods and apparatus for improving responses of automated conversational agents.

BACKGROUND

Nowadays, automated conversational agents are deployed and integrated with online environments to interact with users. The automated conversational agents, such as chatbot or interactive voice response (IVR) system are deployed to assist the users in many ways, such as resolving concerns, making payments, raising inquiries, lodging complaints, and the like. Online environments may include web pages, widgets, links, gaming applications, mobile applications, etc. When an automated conversational agent, for example, a chatbot receives a message from a user, the chatbot determines intent of the message. The automated conversational agent then provides a response to the message based on the intent. The intent enables the automated conversational agent to understand the need of the user and provide a human-like response.

Typically, the intent may be determined using natural language understanding techniques. For example, the intent may be determined based on performing an intent classification using machine learning techniques. In the intent classification, each sentence in the message of the user may be considered as a data point. The data point may be manually annotated to label multiple intent categories. With due course of time, the automated conversational agent may encounter different sentences and learn many intents. The automated conversational agent may become more sophisticated and responsive based on the intents that are learned.

However, there may be a frequent need to update existing intents so that the responses of the automated conversational agent are accurate. There may be a need to add a new intent, split an existing intent into multiple intents or delete an intent. In order to frequently update the existing intents, a significant amount of manual effort may be required. For instance, adding a new intent may entail manually analyzing a huge amount of conversation dataset, which may not be feasible. In case of relabeling the existing intents, sentences of the intents may be manually annotated. In the case of splitting an existing intent into multiple intents or deleting an intent, a developer or a human agent may undergo reading all sentences of an intent pool, which may consume a lot of time.

In view of the above-mentioned problems, there appears a need to devise techniques for improving responses of automated conversational agents in an efficient and feasible manner, while precluding analysis of a huge amount of dataset or an entire intent pool.

SUMMARY

Various embodiments of the present disclosure provide methods and apparatus for improving responses of automated conversational agents.

In an embodiment, a method is disclosed. The method includes receiving, by a processor, a conversational input provided by a user. The method includes generating, by the processor, a vector representation of the conversational input. The method includes determining, by the processor, an intent data of the conversational input based on the vector representation. The method includes facilitating, by the processor, generation of a first set of sentences based on the intent data. The method includes accessing, by the processor, a second set of sentences from a data pool of sentences. The method includes generating, by the processor, a first set of vector representations and a second set of vector representations of the first set of sentences and the second set of sentences respectively. The method includes comparing, by the processor, the first set of vector representations and the second set of vector representations to retrieve a list of similar sentences. The list of similar sentences includes one or more sentences from the second set of sentences semantically matching to the first set of sentences. The method further includes providing, by the processor, the list of similar sentences for updating the intent data of an automated conversational agent.

In another embodiment, an apparatus for updating intent data of an automated conversational agent is disclosed. The apparatus includes a memory and a processor. The memory includes stored instructions. The processor is configured to execute the stored instructions and thereby cause the apparatus to receive a conversational input provided by a user. The apparatus generates a vector representation of the conversational input. The apparatus determines an intent data of the conversational input based on the vector representation. The apparatus facilitates generation of a first set of sentences based on the intent data. The apparatus accesses a second set of sentences from a data pool of sentences. The apparatus generates a first set of vector representations and a second set of vector representations of the first set of sentences and the second set of sentences respectively. The apparatus compares the first set of vector representations and the second set of vector representations to retrieve a list of similar sentences. The list of similar sentences includes one or more sentences from the second set of sentences semantically matching to the first set of sentences. The apparatus further provides the list of similar sentences for updating the intent data of an automated conversational agent.

In another embodiment, a method for updating intent data of an automated conversational agent is disclosed. The method includes receiving, by a processor, a conversational input provided by a user. The method includes generating, by the processor, a vector representation of the conversational input. The method includes determining, by the processor, an intent data of the conversational input based on the vector representation. The method includes facilitating, by the processor, generation of a first set of sentences based on the intent data. The method includes accessing, by the processor, a second set of sentences from a data pool of sentences. The method includes generating, by the processor, a first set of vector representations and a second set of vector representations of the first set of sentences and the second set of sentences respectively. The method includes comparing, by the processor, the first set of vector representations and the second set of vector representations to retrieve a list of similar sentences. The list of similar sentences includes one or more sentences from the second set of sentences semantically matching to the first set of sentences. The method includes facilitating, by the processor, analysis of the list of similar sentences. The method further includes facilitating, by the processor, modification of the intent data based on the analysis.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
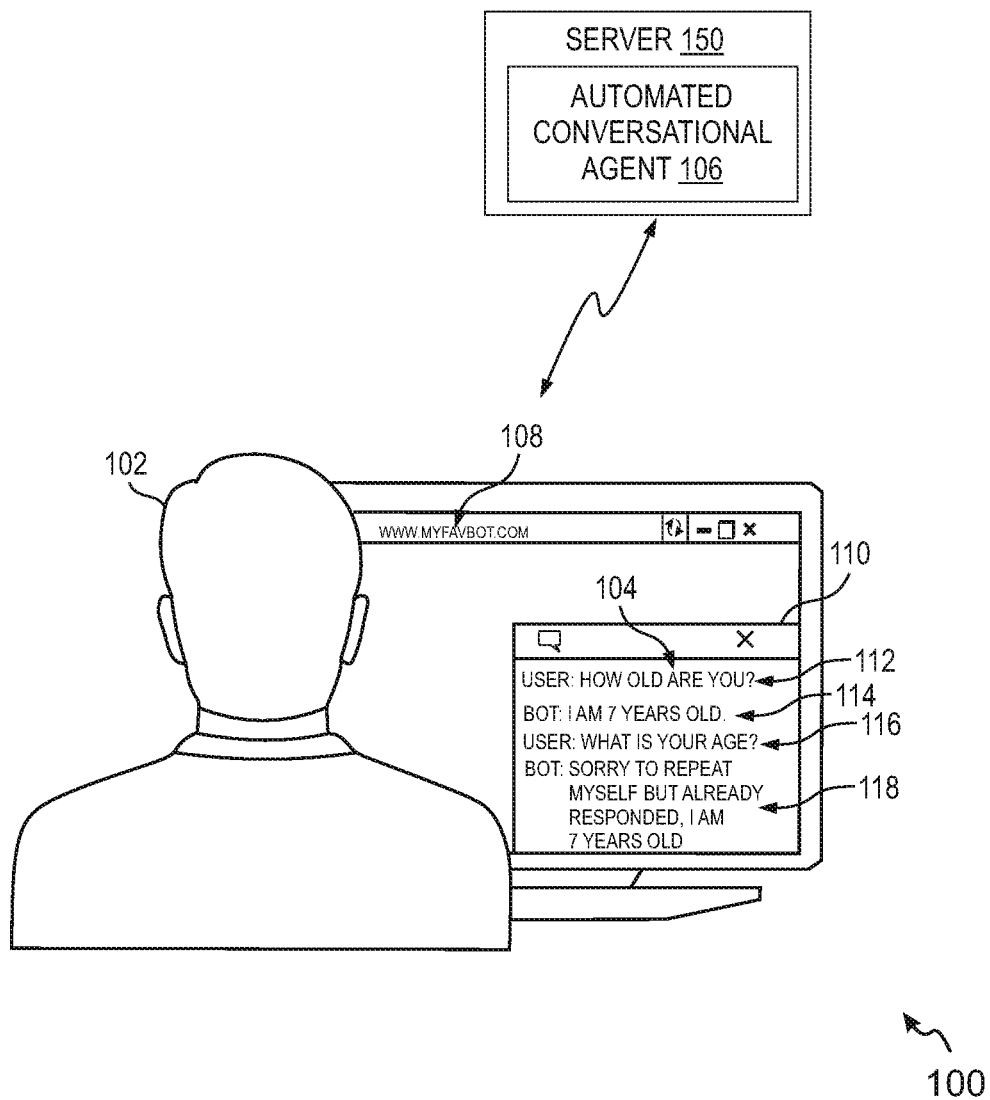
FIG. 1 shows a representation of a user engaged in a chat conversation with an automated conversational agent, in accordance with an example scenario.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and apparatus for improving responses of automated conversational agents that overcome obstacles discussed in the background section in addition to providing additional advantages. More specifically, techniques disclosed herein enable updating intent data of the automated conversational agents, while overcoming the need to analyze a huge amount of dataset. Further, the techniques disclosed herein enable extraction of sentences from an existing intent pool, which precludes the need to read an entire intent pool.

In an example embodiment, a conversational input provided by a user may be represented in a high dimensional space. Representing the conversation input in a high dimensional space includes generating a high dimensional vector representation of the conversational input. The high dimensional vector representation simply referred to hereinafter as vector representation, may be obtained by using an embedding model. The embedding model may capture semantic data and syntactic data of the conversational input. The conversational input may be mapped into vectors based on the semantic data and the syntactic data. Additionally, the vector representation includes vectors of real numbers that may provide efficient processing of data.

In an example embodiment, the embedding model may be pre-trained using machine learning (ML) models, such as deep neural network (DDN) constructed using transformers. The embedding model may be trained using conversation data based on standard back-propagation. The conversation data includes interactions between agents and users. After training the embedding model, the embedding model may be used as an interface for converting any arbitrary conversational input into a vector representation. The vector representation exposes the semantics of the conversational input.

In an illustrative example, a conversational input, such as a sentence with "WHAT IS YOUR AGE?" may be semantically similar to another sentence with "HOW OLD ARE YOU?". These conversational inputs may be provided to the embedding model. The embedding model may convert the conversational inputs into vector representations. There may be no common words between the sentences, "WHAT IS YOUR AGE?" and "HOW OLD ARE YOU?". However, the vector representation of each sentence may be similar as both the sentences are semantically matching. Further, the vector representation may be used to determine an existing intent data, such as 'AGE_INTENT'. In an illustrative example scenario, sentences that correspond to the existing intent data may be annotated under an intent pool 'AGE_INTENT'.

Further, annotators may generate sentences corresponding to the desired intent data. In an example embodiment, annotators may generate the sentences, referred to hereinafter as bait sentences for updating an existing intent data. The annotators may include a human annotator, a software annotator or a combination of both to generate the target sentences. The bait sentences may include sentences that cover multiple aspects of the intent data. After generating the bait sentences, a data pool of sentences may be accessed. In one example embodiment, the data pool of sentences referred to hereinafter as data pool may include an intent pool. The intent pool may be accessed in case of relabeling the existing intent. In another example embodiment, the data pool may include a conversation data pool that stores interactions between agents and users. The conversation data pool may be accessed in case of adding a new intent. Likewise, for splitting an existing intent into one or more categories or deleting the existing intent, the data pool may be accessed. The terms 'data pool of sentences' and 'data pool' are interchangeably used hereinafter.

The bait sentences and the data pool sentences are provided to the embedding model. The embedding model generates vector representations of the bait sentences and vector representations of the data pool sentences. The vector representations of the bait sentences referred to hereinafter as a first set of vector representations and the vector representations of the data pool sentences referred to hereinafter as a second set of vector representations are compared to determine similar sentences. In an example embodiment, the first set of vector representations and the second set of vector representations are compared using a similarity model. The similarity model may determine similar vector representations using nearest neighbor techniques to retrieve similar sentences. More specifically, one or more sentences from the data pool sentences that are semantically matching to the bait sentences are retrieved based on the similar vector representations. The one or more sentences are stored in a list of similar sentences.

The list of similar sentences may be analyzed to determine if any modification of intent data is required. In an example embodiment, the list of similar sentences may be manually examined. For example, a human annotator may examine the list of similar sentences for the modification. In another example embodiment, the list of similar sentences may be examined in an automated manner. The list of similar sentences is analyzed until a convergent point is reached. The convergent point may be reached when the list of similar sentences no longer contains any semantically similar sentences with the bait sentences. In an example embodiment, the convergent point may be determined by a human annotator. In another example embodiment, the convergent point may be programmatically set that may be compared with a pre-defined threshold.

Furthermore, the list of similar sentences may be manually annotated, and the existing intent data may be updated based on the analysis. After updating the intent data, one or more sentences are removed from the data pool based on the modified intent data. Consequently, the size of the data pool may be reduced upon removing the one or more sentences. The intent data may be updated frequently based on the vector representations and thereby improve responses of automated conversational agents.

The vector representations of sentences for updating intent data of automated conversational agents are further explained in detail with reference to FIGS. 1 to 8.

FIG. 1 shows a representation 100 of a user 102 engaged in a chat conversation 104 with an automated conversational agent 106, in accordance with an example scenario. The automated conversational agent 106 may be hosted by a server 150, and may be configured in form of a chatbot or an interactive voice response (IVR) system that may be deployed in online environments for assisting users, such as the user 102. The online environments may include, but are not limited to, web pages, widgets, instant messaging applications, game applications, or the like.

In an illustrative example, the automated conversational agent 106 (i.e., the chatbot) may be deployed and integrated in a Website 108. The user 102 may be browsing the Website 108 and wish to communicate with the automated conversational agent 106. In most cases, widgets or hyperlinks of chatbots may be displayed on Websites, such as the Website 108. The user 102 may click on the widget or the hyperlink to communicate with the chatbot. Upon receiving an input corresponding to the widget or the hyperlink, a chat console such as a chat console 110 may be displayed to the user 102. The user 102 may thereafter engage in a textual chat conversation with a conversational agent, such as the automated conversational agent 106, for the communication. The automated conversational agent 106 is referred to hereinafter as a virtual agent 106.

It is noted that in some example scenarios, the user 102 may also converse with the automated conversational agent 106 (not shown in FIG. 1) via a call. For instance, the user 102 may dial a customer care number and converse with the virtual agent 106 (i.e., the IVR system), to seek assistance therefrom over a voice channel.

As an illustrative example, the user 102 is depicted to provide a conversational input 112 including text 'HOW OLD ARE YOU?' in the chat console 110. The virtual agent 106 may respond to the conversational input 112 by determining an intent of the conversational input 112. The intent may be determined by using natural language understanding techniques. The virtual agent 106 understands that the intent of the conversational input 112 is asking about age intent. The virtual agent 106 may provide a response 114, such as 'I AM 7 YEARS OLD' based on the intent.

The user 102 may further continue providing another conversational input, such as conversational input 116 including text 'WHAT IS YOUR AGE?'. It is understandable that the conversational input 116 is semantically matching to the conversational input 112. The virtual agent 106 understands that the user 102 is inquiring about the same intent. The virtual agent 106 may provide a human like response, such as response 118 including text 'SORRY TO REPEAT MYSELF, BUT ALREADY RESPONDED I AM 7 YEARS OLD'.

With due course of time, the virtual agent 106 may encounter various conversational inputs provided by many users. The virtual agent 106 may provide responses corresponding to the conversational inputs based on existing intent data. However, the existing intents may be become obsolete and the responses may not be accurate. In order to provide the accurate responses, the existing intent data of the virtual agent 106 may be frequently updated. The intent data may be updated in an efficient and feasible manner based on vector representations of sentences.

In an example embodiment, a vector representation of a conversational input may be generated to facilitate modification of existing intent data. The vector representation may be generated using an embedding model, which is explained next with reference to FIG. 2.

Figure 2:
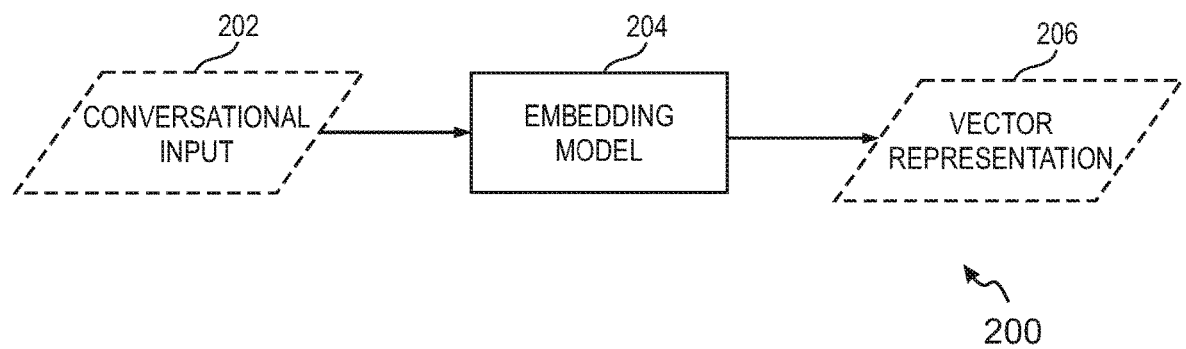
FIG. 2 illustrates a block diagram representation illustrating conversion of a conversational input into a high dimensional vector representation, in accordance with an example scenario.

Referring now to FIG. 2, a block diagram representation 200 is shown for illustrating conversion of a conversational input into a high dimensional vector representation, in accordance with an example scenario. More specifically, the block diagram representation 200 depicts a conversational input 202 (such as the conversational input 112 or the conversational input 116 shown in FIG. 1).

In an embodiment, the conversational input 202 is represented in a high dimensional space. In order to convert the conversational input in the high dimensional space, the conversational input is provided as an input to an embedding model 204. The embedding model 204 is trained to capture a semantic data and a syntactic data of the conversational input 202.

In an example embodiment, the embedding model 204 may be trained to capture the semantic data and the syntactic data using a conversation data. The conversation data may include historical data of interactions between agents and users. The embedding model 204 may be trained using machine learning techniques. For instance, the machine learning techniques may be used to construct a deep neural network (DNN) using transformers to train the embedding model 204.

The embedding model 204 maps the conversational input 202 into vectors based on the semantic data and the syntactic data captured. The conversational input 202 is mapped into the vectors to provide a high dimensional vector representation 206 as an output. The high dimensional vector representation 206 is simply referred to hereinafter as vector representation 206 of the conversational input 202. The vector representation 206 exposes semantic data of the conversational input 202. Referring back to FIG. 1, the conversational input 112 and the conversational input 116 may not have words that are common. The conversational input 112 and the conversational input 116 may be provided to the embedding model 204 as input.

The embedding model 204 generates a vector representation of the conversational input 112 and a vector representation of the conversational input 116 that are similar. As seen in FIG. 1, the conversational input 112 and the conversational input 116 are semantically similar. Thus, the semantic data captured by the embedding model 204 from the conversational input 112 and the conversational input 116 may generate vector representations that are similar.

Furthermore, such conversion of the conversational input 202 into the vector representation 206 facilitates modification of the intent data in an efficient manner. An apparatus for facilitating modification of the intent data is explained with reference to FIG. 3A.

Figure 3A:
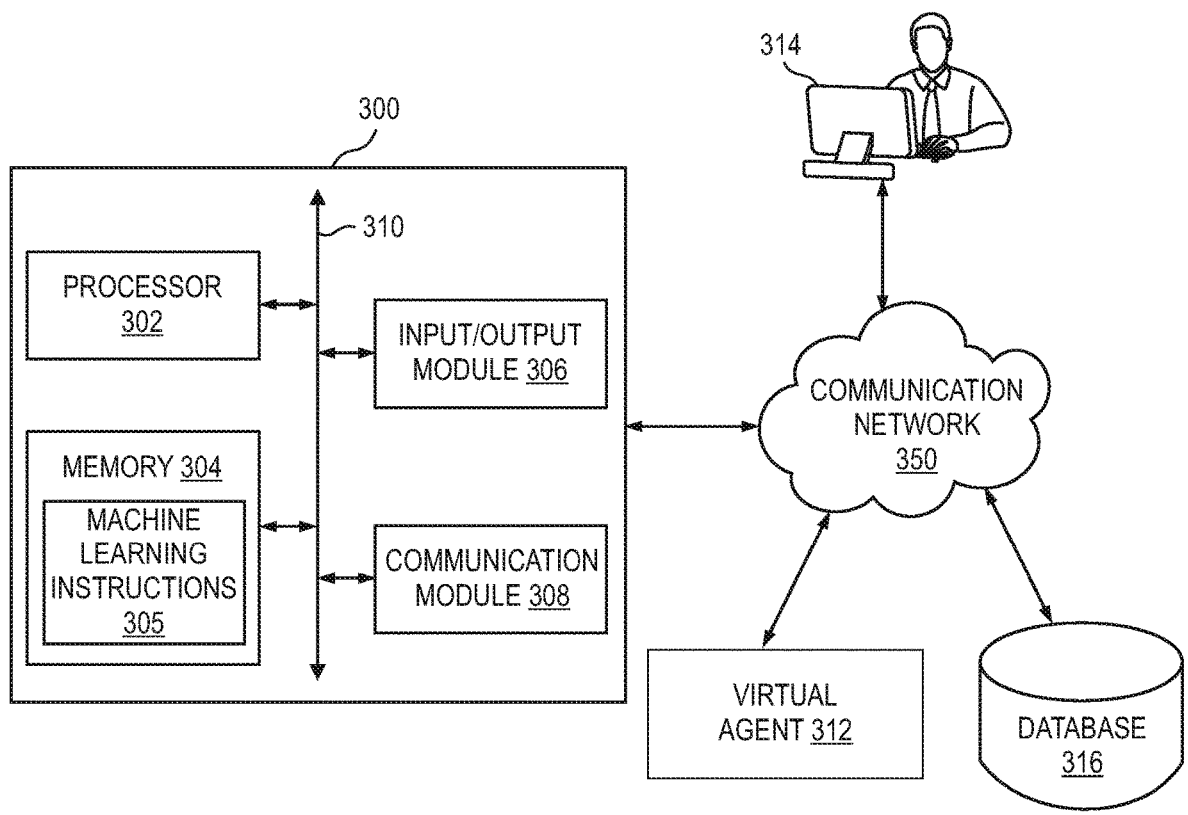
FIG. 3A shows a block diagram of an apparatus configured to facilitate modification of intent data of an automated conversational agent, in accordance with an embodiment of the invention.

FIG. 3A shows a block diagram of an apparatus 300 configured to facilitate modification of intent data of an automated conversational agent, in accordance with an embodiment of the invention. The automated conversational agent is also interchangeably referred to herein as 'virtual agent'. The term 'virtual agent' includes both 'chatbot' and 'interactive voice response (IVR) system'. Accordingly, the virtual agent replies, as used herein, may include both typed textual replies as well as spoken utterances. It is noted that the term 'conversational input' as used herein refers to a textual input or a spoken input provided by the virtual agent or the user during the course of the chat or a voice call interaction.

In an embodiment, the apparatus 300 may be implemented as a platform including a mix of existing open systems, proprietary systems and third-party systems. In another embodiment, the apparatus 300 may be implemented completely as a platform including a set of software layers on top of existing hardware systems. In an embodiment, one or more components of the apparatus 300 may be deployed in a Web Server. In another embodiment, the apparatus 300 may be a standalone component in a remote machine connected to a communication network and capable of executing a set of instructions (sequential and/or otherwise) to facilitate conversion of conversational inputs into vector representations for updating intent data of automated conversational agents. Moreover, the apparatus 300 may be implemented as a centralized system, or, alternatively, the various components of the apparatus 300 may be deployed in a distributed manner while being operatively coupled to each other. In an embodiment, one or more functionalities of the apparatus 300 may also be embodied as a client within devices, such as users' devices. In another embodiment, the apparatus 300 may be a central system that is shared by or accessible to each of such devices.

The apparatus 300 includes at least one processor, such as a processor 302 and a memory 304. It is noted that although the apparatus 300 is depicted to include only one processor, the apparatus 300 may include more number of processors therein. In an embodiment, the memory 304 is capable of storing machine executable instructions, referred to herein as machine learning instructions 305. Further, the processor 302 is capable of executing the machine learning instructions 305. The machine learning instructions 305 may be executed for training an embedding model based on machine learning techniques. Further, the machine learning instructions 305 may be executed for training a similarity model. In an embodiment, the processor 302 may be embodied as a multi-core processor, a single core processor, or a combination of one or more multi-core processors and one or more single core processors. For example, the processor 302 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 302 may be configured to execute hard-coded functionality. In an embodiment, the processor 302 is embodied as an executor of software instructions, wherein the instructions may specifically configure the processor 302 to perform the algorithms and/or operations described herein when the instructions are executed.

The memory 304 may be embodied as one or more volatile memory devices, one or more non-volatile memory devices, and/or a combination of one or more volatile memory devices and non-volatile memory devices. For example, the memory 304 may be embodied as semiconductor memories (such as mask ROM, PROM (programmable ROM), EPROM (erasable PROM), flash memory, RAM (random access memory), etc.), magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable) and DVD (Digital Versatile Disc), BD (BLU-RAY® Disc).

The apparatus 300 also includes an input/output module 306 (hereinafter referred to as an 'I/O module 306') and at least one communication module such as a communication module 308. In an embodiment, the I/O module 306 may include mechanisms configured to receive inputs from and provide outputs to the user of the apparatus 300. To enable reception of inputs and provide outputs to the user of the apparatus 300, the I/O module 306 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like.

In an example embodiment, the processor 302 may include I/O circuitry configured to control at least some functions of one or more elements of the I/O module 306, such as, for example, a speaker, a microphone, a display, and/or the like. The processor 302 and/or the I/O circuitry may be configured to control one or more functions of the one or more elements of the I/O module 306 through computer program instructions, for example, software and/or firmware, stored on a memory, for example, the memory 304, and/or the like, accessible to the processor 302.

The communication module 308 is configured to facilitate communication between the apparatus 300 and one or more remote entities over a communication network, such as a communication network 350. For example, the communication module 308 may enable communication between the apparatus 300 and devices of users or systems configuring virtual agents for providing service and support based assistance to the users. As an illustrative example, the communication module 308 is depicted to facilitate communication with a virtual agent 312 over the communication network 350.

In an embodiment, the communication module 308 may include several channel interfaces to receive information from a plurality of interaction channels. Some non-exhaustive examples of the interaction channels may include a Web channel (i.e. an enterprise Website), a voice channel (i.e. voice-based customer support), a chat channel (i.e. a chat support), a native mobile application channel, a social media channel, and the like. Each channel interface may be associated with a respective communication circuitry such as for example, a transceiver circuitry including antenna and other communication media interfaces to connect to the communication network 350. The communication circuitry associated with each channel interface may, in at least some example embodiments, enable transmission of data signals and/or reception of signals from remote network entities, such as Web servers hosting Websites or servers for user support and service center configured to maintain real-time information related to interactions between users and virtual agents.

In at least one example embodiment, the channel interfaces are configured to receive up-to-date information related to the interactions between the users and the virtual agents from the interaction channels. In some embodiments, the information may also be collated from the plurality of devices utilized by the users. To that effect, the communication module 308 may be in operative communication with various user touch points, such as electronic devices associated with the customers, Websites visited by the users, devices used by the virtual agents (for example, voice agents, chat agents, IVR systems, in-store agents, and the like) engaged by the users and the like. As an illustrative example, the communication module 308 is depicted to be communicably associated with a user's user device 314 over the communication network 350.

The communication module 308 may further be configured to receive information related to user interactions with virtual agents, such as voice or chat interactions between the users and the virtual agents being conducted using various interaction channels, in real-time and provide the information to the processor 302. In at least some embodiments, the communication module 308 may include relevant Application Programming Interfaces (APIs) to communicate with remote data gathering servers associated with such enterprise interaction channels over the communication network 350. The communication network 350 may be embodied as a wired communication network (for example, Ethernet, local area network (LAN), etc.), a wireless communication network (for example, a cellular network, a wireless LAN, etc.) or a combination thereof (for example, the Internet).

In another example embodiment, the communication module 308 may be configured to access dataset from a data pool. In an example embodiment, the data pool may be stored in a database, such as database 316. The data pool may include interactions between the users and the virtual agents. It shall be noted that the interactions may include sentences exchanged between agents (such as human agents and virtual agents) and the users. The database 316 may be further configured to store intent pools corresponding to existing intents of the virtual agents. In one example scenario, the database 316 may be embodied in the apparatus 300. In another example scenario, the database 316 may exist as a stand-alone that may be associated with data storage of the virtual agents.

In an embodiment, various components of the apparatus 300, such as the processor 302, the memory 304, the I/O module 306 and the communication module 308 are configured to communicate with each other via or through a centralized circuit system 310. The centralized circuit system 310 may be various devices configured to, among other things, provide or enable communication between the components (302-308) of the apparatus 300. In certain embodiments, the centralized circuit system 310 may be a central printed circuit board (PCB) such as a motherboard, a main board, a system board, or a logic board. The centralized circuit system 310 may also, or alternatively, include other printed circuit assemblies (PCAs) or communication channel media.

It is noted that the apparatus 300 as illustrated and hereinafter described is merely illustrative of an apparatus that could benefit from embodiments of the invention and, therefore, should not be taken to limit the scope of the invention. It is noted that the apparatus 300 may include fewer or more components than those depicted in FIG. 3A.

In an embodiment, the processor 302 may include a plurality of modules capable of converting conversational inputs into vector representations for updating intent data. The modules of the processor 302 are described next with reference to FIG. 3B.

Figure 3B:
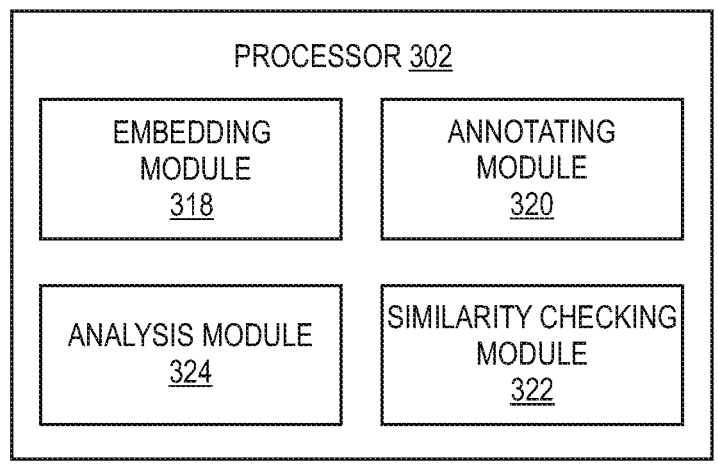
FIG. 3B shows a block diagram of a processor of the apparatus of FIG. 3A, in accordance with an embodiment of the invention.

FIG. 3B shows a block diagram of the processor 302 of the apparatus 300 of FIG. 3A, in accordance with an embodiment of the invention. The processor 302 is depicted to include an embedding module 318, an annotating module 320, a similarity checking module 322 and an analysis module 324. The various modules of the processor 302 may be implemented using software, hardware, firmware or a combination thereof. It is also noted that various modules of the processor 302 are depicted herein for example purposes and that the processor 302 may include fewer or more modules than those depicted in FIG. 3B.

In an example embodiment, the embedding module 318 accepts a conversational input, such as the conversational input 202 shown in FIG. 2. The embedding module 318 converts the conversational inputs into a vector representation, such as the vector representation 206.

In an example embodiment, the embedding module 318 is configured to represent any arbitrary conversational input (such as the conversational input 112 or the conversational input 116 shown in FIG. 1) in a high dimensional space. More specifically, the embedding module 318 is configured to convert the conversational input into a vector representation using an embedding model. As mentioned with reference to FIG. 3A, the machine learning instructions 305 are executed to train the embedding model. The embedding module 318 is configured to train the embedding model using conversation data. The embedding model captures semantic data and syntactic data of sentences from the conversation data. After training the embedding model, the trained embedding model captures semantic data of the conversational input. The semantic data are mapped into vectors to generate the vector representation. Further, the vector representation may be used for determining semantically similar sentences.

In an example embodiment, the annotating module 320 is configured to generate bait sentences that cover multiple aspects of an intent data. The bait sentences may be generated by annotators based on intent data that needs to be updated. In one example scenario, the intent data mentioned herein may include an existing intent that needs to be relabeled (refer FIGS. 5A and 5B). In another example scenario, the intent may be a new intent that needs to be added (refer FIGS. 6A and 6B). It must be noted that the annotators mentioned herein may include a human annotator, a software annotator or a combination of both. The term 'bait sentences' is referred to hereinafter as a first set of sentences. The term 'bait sentences' and the term 'first set of sentences' are used interchangeably hereinafter.

After generating the first set of sentences, sentences of a data pool are accessed. The data pool may include an intent data pool and a conversation data pool. In case of relabeling an existing intent, the sentences of the intent data pool are accessed. In case of adding a new intent, the sentences of the conversation data pool are accessed. The terms 'sentences of the data pool', 'sentences of the conversation data pool' and 'sentences of existing intent pool' are collectively referred to hereinafter as second set of sentences. The second set of sentences may be accessed from a database, such as the database 316 of FIG. 3A. The first set of sentences and the second set of sentences are provided to the embedding module 318.

The embedding module 318 is further configured to generate a first set of vector representations and a second set of vector representations of the first set of sentences and the second set of sentences, respectively. The first set of vector representations and the second set of vector representations are generated using the embedding model. Further, the first set of vector representations and the second set of vector representations may be provided to the similarity checking module 322.

The similarity checking module 322 is configured to compare the first set of vector representations and the second set of vector representations to determine one or more similar sentences between the first set of sentences and the second set of sentences. More specifically, the similarity checking module 322 is configured to determine one or more sentences from the second set of sentences that are semantically similar to the first set of sentences. In an example embodiment, the similarity checking module 322 compares the first set of vector representations and the second set of vector representations using a similarity model. The similarity checking module 322 may be capable of executing the machine learning instructions 305 of FIG. 3A to train the similarity model. The similarity model may extract vector representations that are similar based on the comparison. In at least one example embodiment, the similarity model may obtain the similar vector representations using a nearest neighbor classification technique.

The semantically similar sentences are retrieved based on the similar vector representations. In an example embodiment, the similarity model may be trained to determine similar sentences based on the nearest neighbor model. The one or more semantically similar sentences are stored in a list of similar sentences.

The list of similar sentences is analyzed for updating the intent data. In an example embodiment, the analysis module 324 may be configured to alert a human annotator, such as a developer or a human agent to facilitate analysis of the list of similar sentences. The list of similar sentences may be analyzed manually to update the intent data. After analyzing, the list of similar sentences may be manually annotated. The analysis of the list of similar sentences may continue until a convergent point is reached. In an example embodiment, the convergent point may be determined by a human annotator. In another example embodiment, the convergent point may be programmatically set. The convergent point may be then compared with a pre-defined threshold. After updating the intent data, one or more sentences from the second set of sentences (i.e., the data pool) are removed based on the updated intent data. It is noted that the one or more sentences correspond to sentences in the list of similar sentences.

The overall process of updating intent data of an automated conversational agent using vector representations of sentences is described next with reference to FIG. 4.

Figure 4:
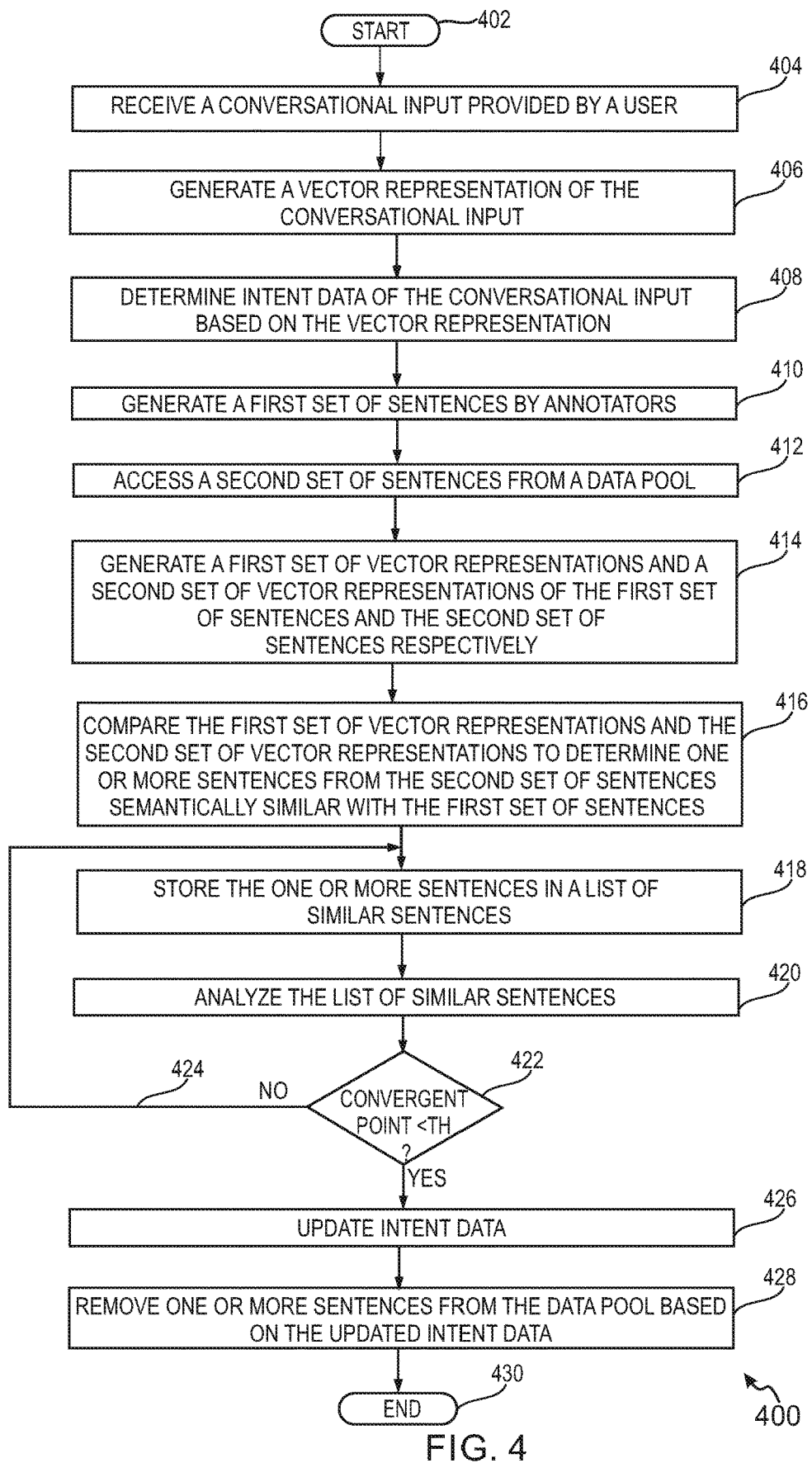
FIG. 4 illustrates a flow chart diagram for updating intent data of an automated conversational agent, in accordance with an example embodiment of the present disclosure.

Referring now to FIG. 4, a flow chart diagram 400 for updating intent data of an automated conversational agent is illustrated in accordance with an example embodiment of the present disclosure. The method 400 depicted in the flow diagram may be executed by, for example, the apparatus 300. Operations of the method 400 and combinations of operation in the flow diagram, may be implemented by, for example, hardware, firmware, a processor, circuitry and/or a different device associated with the execution of software that includes one or more computer program instructions. At 402, updating of intent data starts.

At 404, a conversational input provided by a user is received. At 406, a vector representation of the conversational input is generated. In an example embodiment, the vector representation is generated using an embedding model, such as the embedding model 204 of FIG. 2. As explained with reference to FIG. 3B, the embedding module 318 is configured to generate the vector representation using the embedding model. The vector representation exposes semantic data of the conversational input provided by the user. At 408, an intent of the conversational input is determined based on the vector representation.

At 410, a first set of sentences is generated by annotators. The annotators may include a human annotator or a programmatic annotator. In an example embodiment, the first set of sentences may be generated based on the intent. As explained with reference to FIG. 3B, the annotating module 320 is configured to generate the first set of sentences (i.e., the bait sentences) that cover multiple aspects of an intent.

At 412, a second set of sentences is accessed from a data pool after generating the first set of sentences. In case of relabeling an intent data, the second set of sentences may correspond to an intent pool. For example, for an intent data 'RESTAURANT_SEARCH_INTENT', the intent pool may store sentences, such as 'RESERVE A TABLE AT ITALIAN RESTAURANT', 'FIND A PIZZARIA', 'SEARCH FOOD STALLS NEARBY', 'BOOK A TABLE FOR TWO IN ITALIAN RESTAURANT', or the like. These sentences may be accessed from the intent pool as the second set of sentences. In case of adding a new intent data, the second set of sentences may be accessed from a conversation data pool. The conversation data pool may store sentences that are present in interactions between agents and users. For example, the conversation data pool may store sentences, such as 'HI, I AM HUNGRY', 'WHAT WOULD YOU LIKE TO HAVE', 'I WANT ITALIAN FOOD', 'FROM WHERE DO YOU WANT TO EAT', 'CAN YOU LOCATE ITALIAN RESTAURANT', 'TWO ITALIAN RESTAURANTS FOUND NEAR YOUR LOCATION', 'RESERVE A TABLE AT ITALIAN RESTAURANT', 'BOOK A TABLE FOR TWO' and more.

At 414, a first set of vector representations and a second set of vector representations of the first set of sentences and the second set of sentences are generated respectively. As explained with reference to FIG. 3B, the embedding module 318 is configured to generate the first set of vector representations and the second set of vector representations using the embedding model.

At 416, the first set of vector representations and the second set of vector representations are compared to determine one or more sentences from the second set of sentences that are semantically similar to the first set of sentences. The first set of vector representations and the second set of vector representations are provided to the similarity checking module 322. In an example embodiment, similarity between the first set of vector representations and the second set of vector representations may be determined using a similarity model. The similarity model may obtain similar vector representations using a nearest neighbor classification technique. The similar vector representations are used to retrieve one or more sentences of the second set of sentences that are semantically similar to the first set of sentences.

At 418, the one or more sentences are stored in a list of similar sentences. At 420, the list of similar sentences is analyzed for updating the intent. At 422, the list of similar sentences is analyzed till a convergent point reaches a pre-defined threshold. The term 'convergent point' mentioned herein corresponds to a point when there is no sentence in the list of similar sentences that is similar to the first set of sentences.

At 424, retrieving of the list of similar sentences and analyzing the list of similar sentences are continued until the convergent point is reached. At 426, the list of similar sentences is manually annotated to update the intent data. At 428, one or more sentences are removed from the data pool based on the updated intent data. More specifically, one or more sentences of the list of similar sentences that are in the data pool are discarded after updating the intent data. The data pool size may be reduced after discarding the one or more sentences. At 430, updating of the intent data ends.

In an example embodiment, updating the intent data may include relabeling the existing intent data, which is described next with reference to FIGS. 5A and 5B.

Figure 5A:
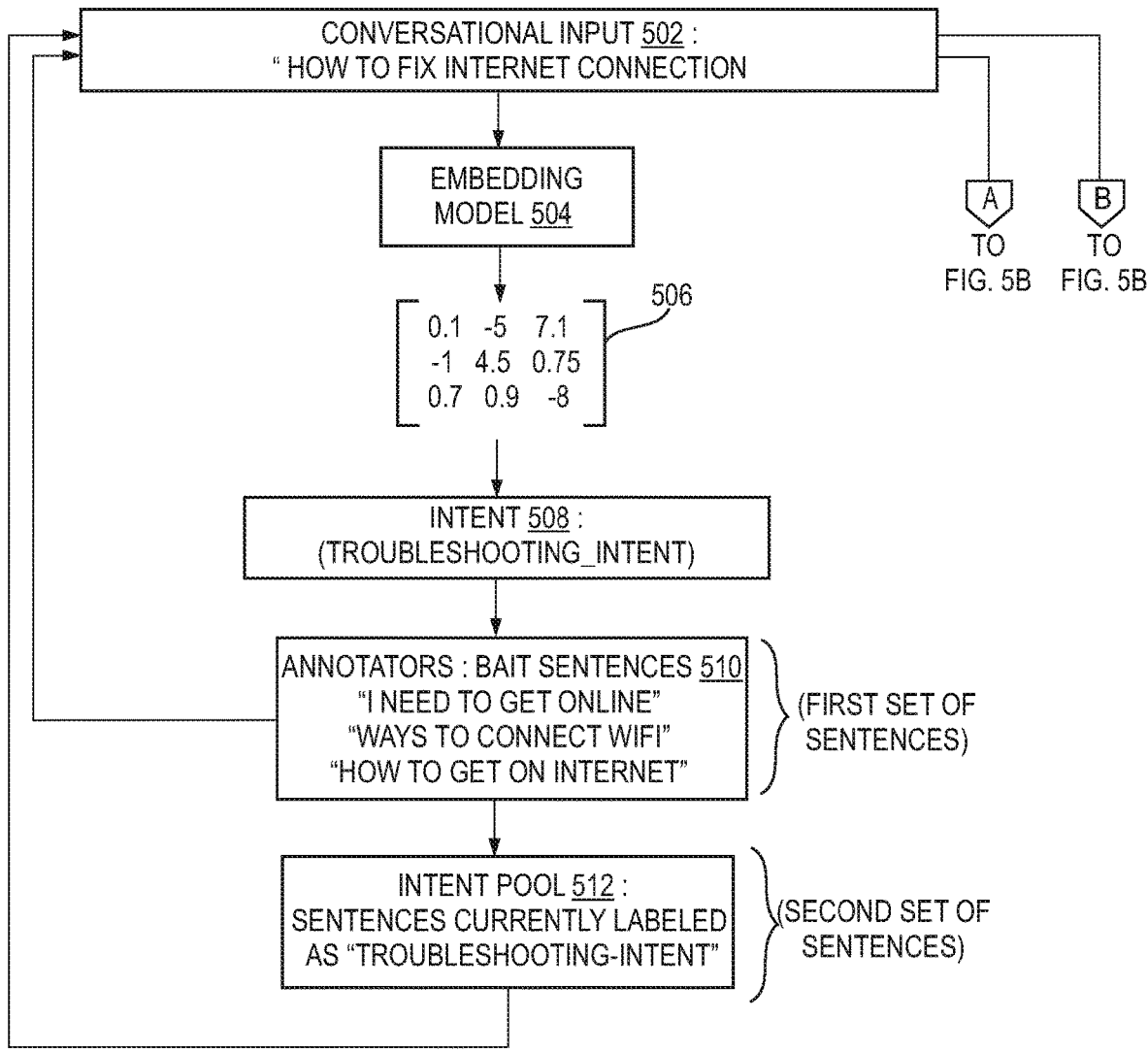
FIGS. 5A and 5B collectively illustrate a representation of updating intent data of an automated conversational agent, in accordance with an example embodiment of the present disclosure.
Figure 5B:
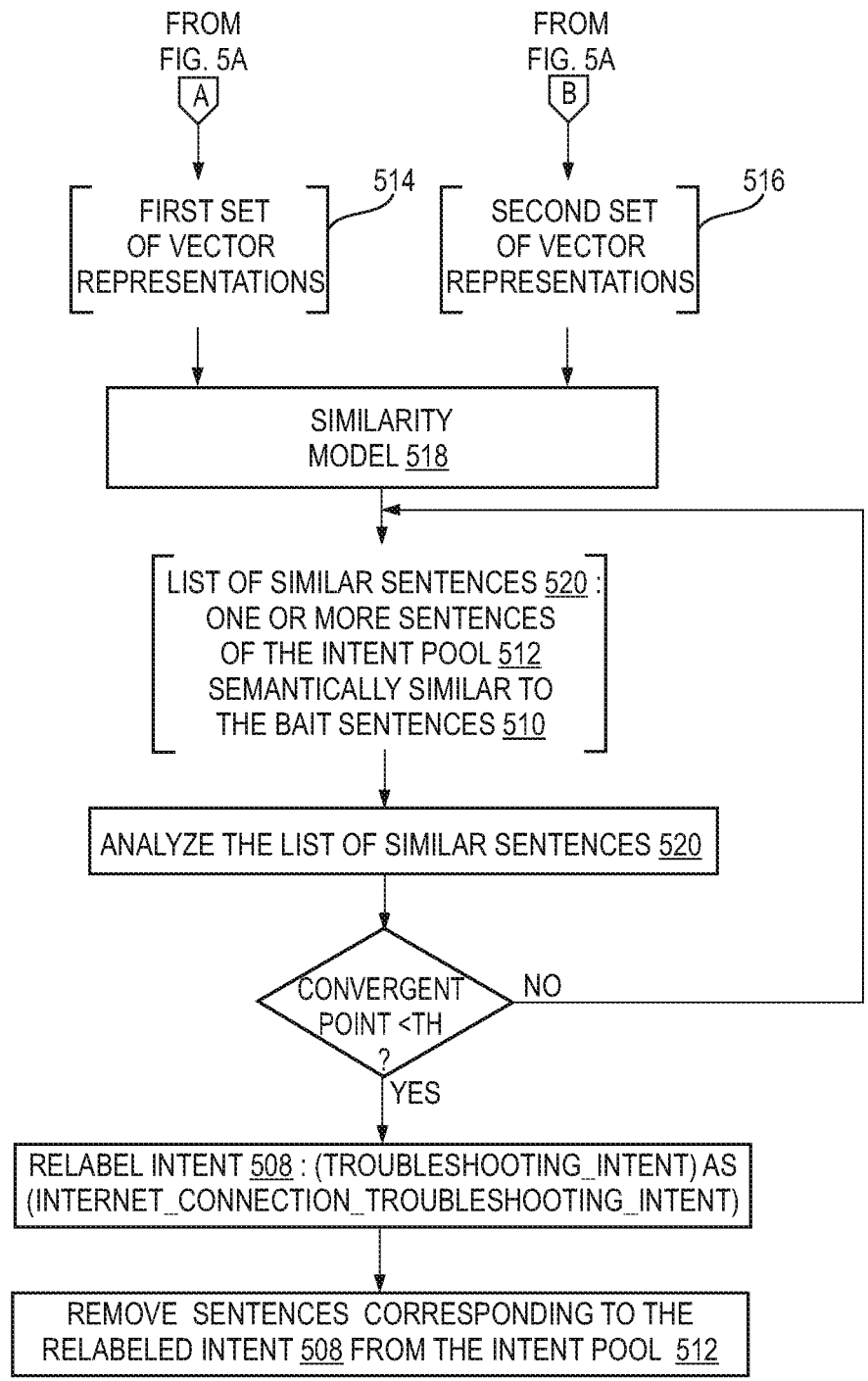

Referring now to FIGS. 5A and 5B a representation 500 of updating intent data is illustrated, in accordance with an example embodiment of the present disclosure. The representation 500 depicts a conversational input 502 with an exemplary sentence 'HOW TO FIX INTERNET CONNECTION'. It is noted that the conversational input 502 may include sentences other than the sentence shown in FIGS. 5A and 5B.

The conversational input 502 is provided to embedding model 504. The embedding model 504 converts the conversational input 502 into a vector representation, such as vector representation 506. As described with reference to FIG. 2, the embedding model 504 is trained to capture semantic data of the conversational input 502. The semantic data captured are represented as vectors as shown in FIGS. 5A and 5B. It must be noted that the vectors in the vector representation 506 are exemplary and shown for illustration purpose.

In an example embodiment, an intent, such as intent 508 of the conversational input 502 is determined based on the vector representation 506. The intent 508 may correspond to an existing intent, such as 'TROUBLESHOOTING_INTENT'.

Further, bait sentences 510 is generated based on the intent 508. The bait sentences may include sentences, such as 'I NEED TO GET ONLINE', 'WAYS TO CONNECT WIFI', 'HOW TO GET ON INTERNET?' or the like. The bait sentences 510 may be generated by annotators. In one example embodiment, the bait sentences 510 may be generated by a program-based annotator. In another example embodiment, the bait sentences 510 may be generated by a human annotator. The bait sentences 510 represent a first set of sentences.

After generating the first set of sentences, an intent pool, such as an intent pool 512 is accessed. The intent pool 512 includes sentences labelled as 'TROUBLESHOOTING_INTENT'. The labelled sentences represent a second set of sentences.

The first set of sentences (i.e., the bait sentences) and the second set of sentences (i.e., the labelled sentences in the intent pool 512) are provided to the embedding model 504. The embedding model 504 converts the first set of sentences and the second set of sentences into a first set of vector representations 514 and a second set of vector representations 516, respectively.

The first set of vector representations 514 and the second set of vector representations 516 are provided to similarity model 518. The similarity model 518 may compare the first set of vector representations 514 and the second set of vector representations 516 to determine semantically similar sentences between the first set of sentences and the second set of sentences. In an example embodiment, the semantically similar sentences may be determined using a nearest neighbor technique.

The semantically similar sentences are stored in a list of similar sentences 520. The list of similar sentences 520 may include one of more sentences of the intent pool 512 that are semantically similar to the bait sentences 510.

The list of similar sentences 520 is analyzed to update the existing intent 508. In an example embodiment, the list of similar sentences 520 is manually analyzed to relabel the intent 508. In another example embodiment, the list of similar sentences 520 may be analyzed in an automated manner.

The retrieval of the list of similar sentences 520 and the analysis of the list of similar sentences 520 are repeated until a convergent point is reached. The convergent point may be reached when the list of similar sentences 520 does not contain any semantically similar sentence to the bait sentences 510. In an example embodiment, the convergent point may be compared with a pre-defined threshold value. The pre-defined threshold value may be determined by a human annotator or may be programmatically set.

After analyzing the list of similar sentences 520, the existing intent 508 with 'TROUBLESHOOTING_INTENT' is relabeled as 'INTERNET_CONNECTION_TROUBLESHOOTING_INTENT'. Further, sentences corresponding to the relabeled intent 508 are removed from the intent pool 512 and size of the intent pool 512 is reduced.

In another example embodiment, a new intent may be added to improve responses of the automated conversational agent. The new intent may be introduced in order to provide accurate responses corresponding to conversational inputs provided by users. For adding the new intent, sentences in a conversation data pool are accessed, which is explained next with reference to FIGS. 6A and 6B.

Figure 6A:
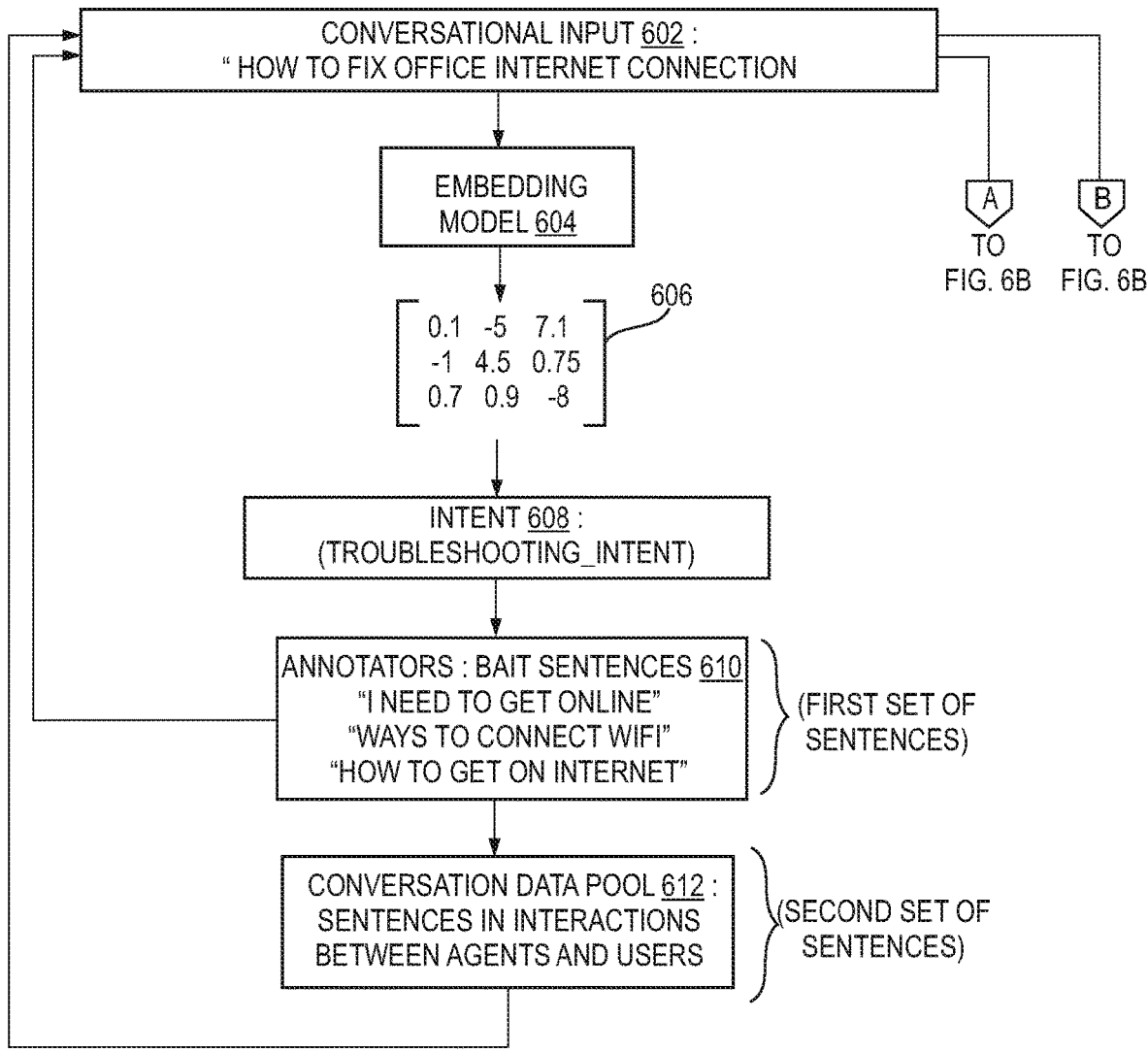
FIGS. 6A and 6B collectively illustrate a representation of updating intent data of the automated conversational agent, in accordance with another example embodiment of the present disclosure.
Figure 6B:
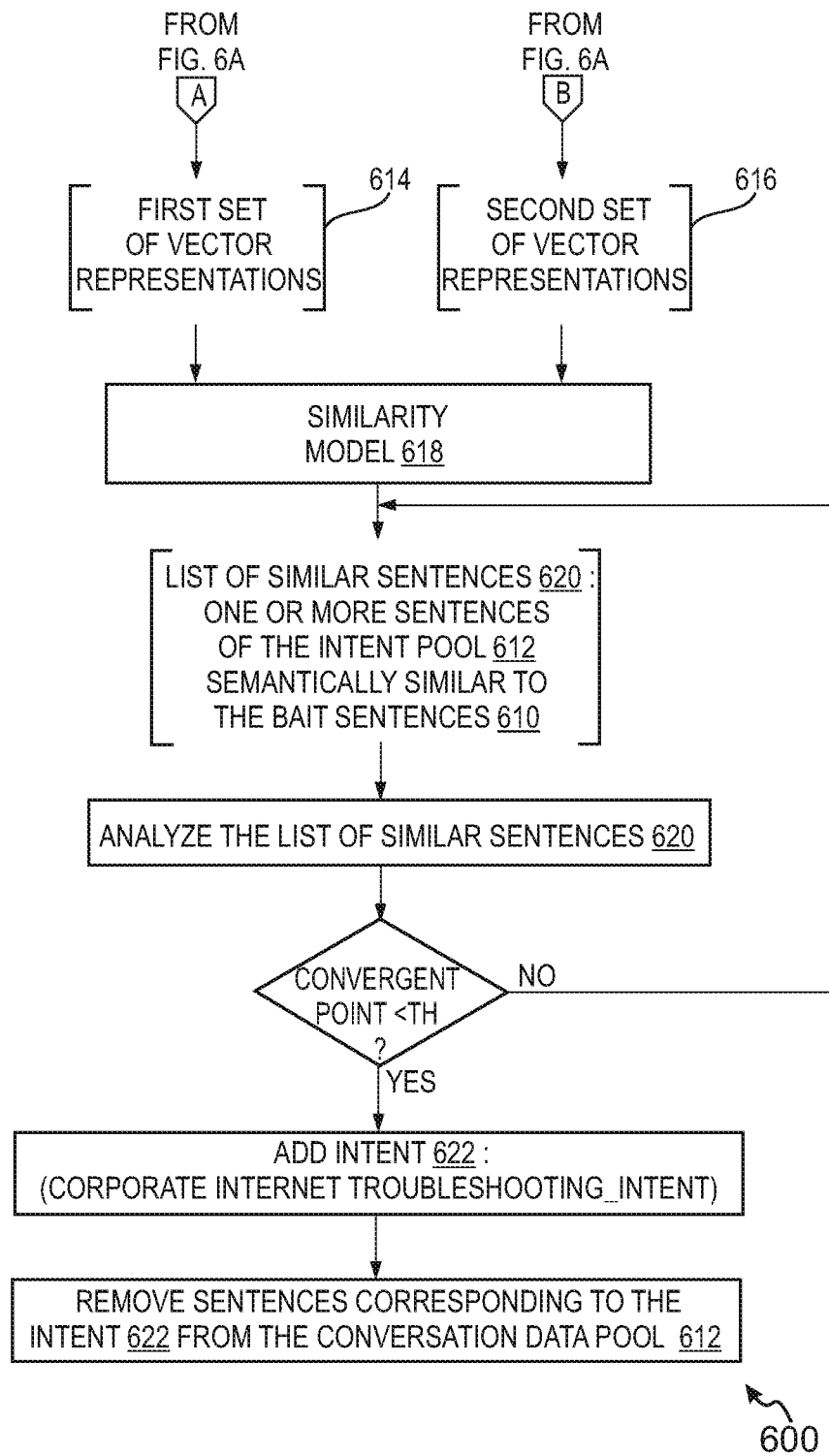

Referring now to FIGS. 6A and 6B, a representation 600 of updating intent data of the automated conversational agent is illustrated, in accordance with an example embodiment of the present disclosure. The representation 600 depicts a conversational input 602 with an exemplary sentence 'HOW TO FIX OFFICE INTERNET CONNECTION'.

The conversational input 602 is provided to embedding model 604. The embedding model 604 converts the conversational input 602 into vector representation 606. The intent 608 of the conversational input 602 is determined based on the vector representation 606. The intent 608 corresponds to an existing intent, such as 'TROUBLESHOOTING_INTENT'.

Further, bait sentences 610 are generated by annotators based on the intent 608. The bait sentences 610 represent a first set of sentences. After generating the first set of sentences, a conversation data pool, such as conversation data pool 612 is accessed. The conversation data pool 612 includes data corresponding to interactions between agents and users. The sentences of the conversation data pool represent a second set of sentences.

The first set of sentences (i.e., the bait sentences 610) and the second set of sentences (i.e., the sentences of the conversation data pool 612) are provided to the embedding model 604. The embedding model 604 converts the first set of sentences and the second set of sentences into a first set of vector representations 614 and a second set of vector representations 616 respectively.

The first set of vector representations 614 and the second set of vector representations 616 are provided to similarity model 618. The similarity model 518 may compare the first set of vector representations 614 and the second set of vector representations 616 to determine semantically similar sentences between the first set of sentences and the second set of sentences. In an example embodiment, the semantically similar sentences may be determined using a nearest neighbor technique.

The semantically similar sentences may be stored in a list of similar sentences 620. The list of similar sentences 620 may include one of more sentences of the conversation data pool 612 that are semantically similar to the bait sentences 510.

The list of similar sentences 620 are analyzed to add a new intent 622. In an example embodiment, the list of similar sentences 620 may be manually analyzed. In another example embodiment, the list of similar sentences 620 may be analyzed in an automated manner.

The retrieval of the list of similar sentences 620 and the analysis of the list of similar sentences 620 may be repeated until a convergent point is reached. The convergent point may be reached when the list of similar sentences 620 does not contain any semantically similar sentence to the bait sentences 610. In an example embodiment, the convergent point may be compared with a pre-defined threshold value. The pre-defined threshold value may be determined by a human annotator or may be programmatically set.

After analyzing the list of similar sentences, a human annotator may add the intent 622. As shown in FIGS. 6A and 6B, the intent 622 with 'CORPORATE INTERNET TROUBLESHOOTING_INTENT' may be added as the new intent. Further, sentences that correspond to the new intent 622 are removed from the conversation data pool 632. The removed sentences may be collected in a new intent pool of the intent 612.

Figure 7:
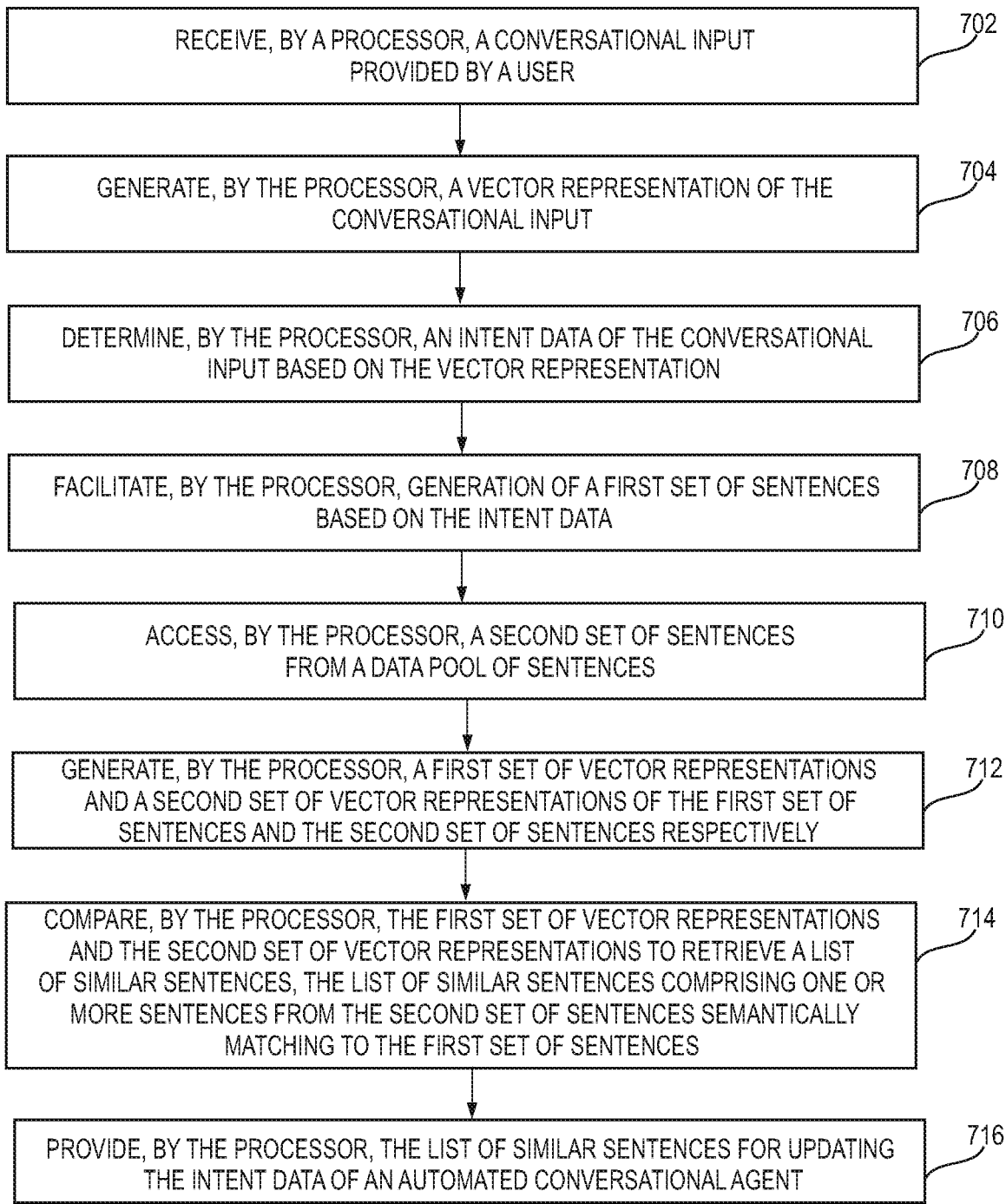
FIG. 7 shows a method flow diagram of updating an intent data of an automated conversational agent, in accordance with an example embodiment of the present disclosure.

FIG. 7 shows a flow diagram depicting a method 700 for updating an intent data of an automated conversational agent, in accordance with an example embodiment of the present disclosure. The method 700 depicted in the flow diagram may be executed by, for example, the apparatus 300. Operations of the method 700 and combinations of operation in the flow diagram, may be implemented by, for example, hardware, firmware, a processor, circuitry and/or a different device associated with the execution of software that includes one or more computer program instructions. The method 700 starts at operation 702.

At operation 702, the method 700 includes receiving, by a processor, a conversational input provided by a user.

At operation 704, the method 700 includes generating, by the processor, a vector representation of the conversational input. The vector represented is generated by capturing a semantic data and a syntactic data of the conversational input and generating vectors of the semantic data and the syntactic data. Further, the conversational input is mapped into the vectors. In an example embodiment, the semantic data and the syntactic are captured using an embedding model. The embedding model is trained using a conversation data. The conversation data correspond to interactions between agents and users.

At operation 706, the method 700 includes determining, by the processor, an intent data of the conversational input based on the vector representation. The vector representation exposes semantic of the conversational input that enable determining the intent data.

At operation 708, the method 700 includes facilitating, by the processor, generation of a first set of sentences based on the intent data. The first set of sentences includes sentences that cover multiple aspects of the intent data. For example, for an intent data 'FAV_COLOR_INTENT' the first set of sentences may include 'I LIKE BLUE COLOR', 'MY FAVOURITE COLOR IS BLUE', 'BLUE IS MY COLOR', etc.

At operation 710, the method 700 includes accessing, by the processor, a second set of sentences from a data pool of sentences. The data pool of sentences may include one of an intent pool or a conversation data pool depending on type of updating intent data. In one example scenario, the second set of sentences may be accessed from the intent pool for relabeling an existing intent, which is explained in FIGS. 5A and 5B. In another example scenario, the second set of sentences may be accessed form the conversation data pool for adding a new intent, which is explained in FIGS. 6A and 6B.

At operation 712, the method 700 includes generating, by the processor, a first set of vector representations and a second set of vector representations of the first set of sentences and the second set of sentences respectively. The first set of vector representations corresponding to the first set of sentences and the second set of vector representations corresponding to the second set of sentences. In an illustrative example scenario, the bait sentences and the sentences of the data pool are converted into vector representations, such as the first set of vector representations and the second set of vector representations. The first set of vector representations and the second set of vector representations are generated using the embedding model.

At operation 714, the method 700 includes comparing, by the processor, the first set of vector representations and the second set of vector representations to retrieve a list of similar sentences. The list of similar sentences includes one or more sentences from the second set of sentences semantically matching to the first set of sentences. In an illustrative example scenario, the list of similar sentences includes sentences of the data pool that are semantically matching with the bait sentences. In an example embodiment, the list of similar sentences may be retrieved by using a similarity model. The similarity model may be based on a nearest neighbor technique to determine sentences of the data pool that are similar to the bait sentences.

At operation 716, the method 700 includes providing, by the processor, the list of similar sentences for updating intent data of an automated conversational agent. In an example embodiment, the list of similar sentences may be manually examined. In another example embodiment, the list of similar sentences may be analyzed in an automated manner. After analyzing the list of similar sentences, a human annotator may manually annotate the one or more sentences in the list of similar sentences and accordingly update intent data. The example scenarios of updating the intent data are shown in FIGS. 5A and 5B and FIGS. 6A and 6B. The method 700 ends at operation 716.

It shall be noted that one or more operations of the method 700 may be grouped together and performed in form of a single step, or one operation may have several sub-steps that may be performed in parallel or in sequential manner.

Figure 8:
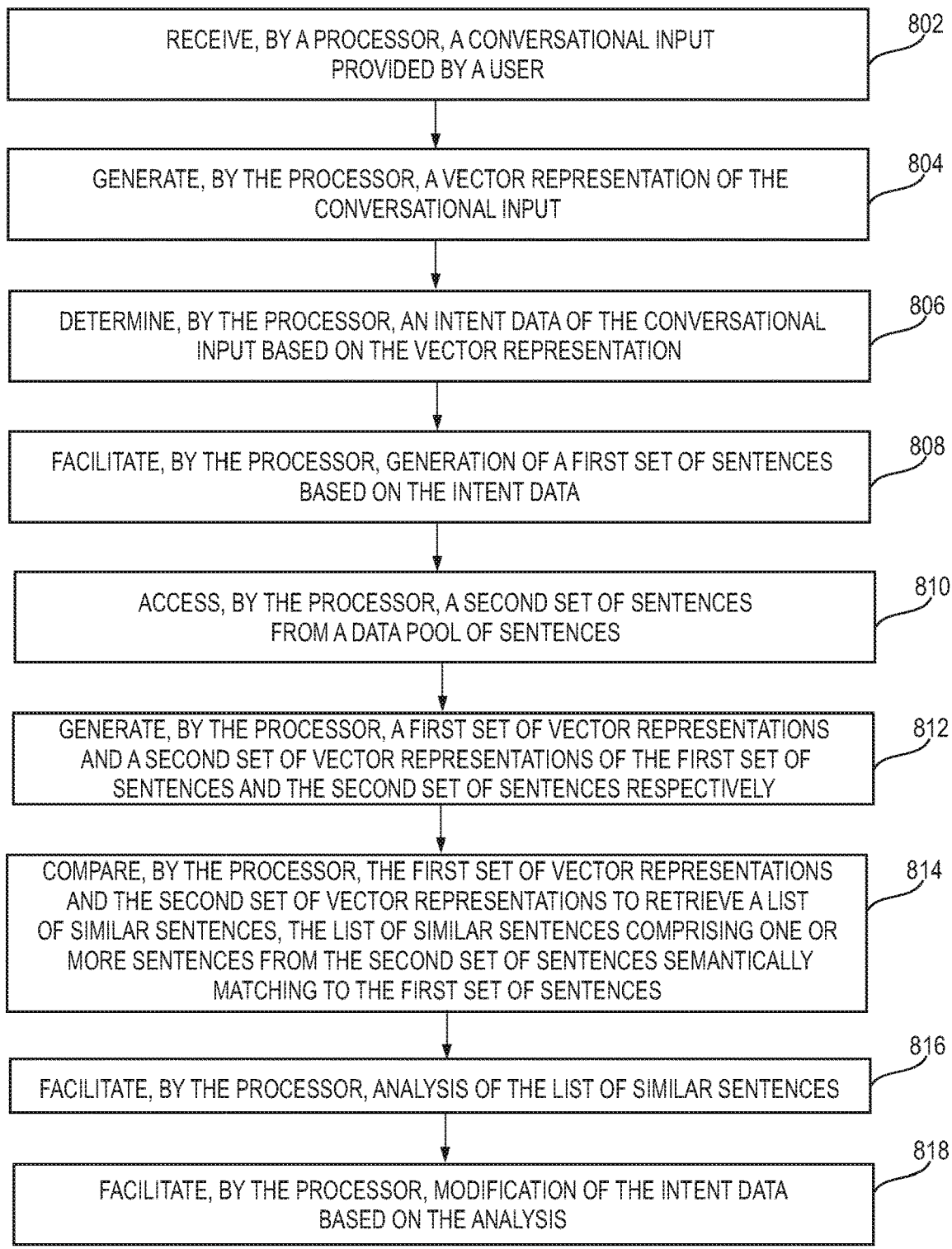
FIG. 8 shows a method flow diagram of updating the intent data of the automated conversational agent, in accordance with another example embodiment of the present disclosure.

FIG. 8 shows a flow diagram depicting a method 800 for updating the intent data of the automated conversational agent, in accordance with another example embodiment of the present disclosure. The method 800 depicted in the flow diagram may be executed by, for example, the apparatus 300. Operations of the method 800 and combinations of operation in the flow diagram, may be implemented by, for example, hardware, firmware, a processor, circuitry and/or a different device associated with the execution of software that includes one or more computer program instructions. The method 800 starts at operation 802.

At operation 802, the method 800 includes receiving, by a processor, a conversational input provided by a user.

At operation 804, the method 800 includes generating, by the processor, a vector representation of the conversational input.

At operation 806, the method 800 includes determining, by the processor, an intent data of the conversational input based on the vector representation.

At operation 808, the method 800 includes facilitating, by the processor, generation of a first set of sentences based on the intent data.

At operation 810, the method 800 includes accessing, by the processor, a second set of sentences from a data pool of sentences.

At operation 812, the method 800 includes generating, by the processor, a first set of vector representations and a second set of vector representations of the first set of sentences and the second set of sentences respectively. The first set of vector representations corresponds to the first set of sentences and the second set of vector representations corresponds to the second set of sentences At operation 814, the method 800 includes comparing, by the processor, the first set of vector representations and the second set of vector representations to retrieve a list of similar sentences. The list of similar sentences comprising one or more sentences from the second set of sentences semantically matching to the first set of sentences. Operations 802-814 are similar to operations 702-714 and have been explained with reference to FIG. 7. The description of the same has been omitted here for the sake of brevity.

At operation 816, the method 800 includes facilitating, by the processor, analysis of the list of similar sentences. In an example embodiment, the list of similar sentences may be manually analyzed. For instance, a human annotator may examine the list of similar sentences. In another example embodiment, the list of similar sentences may be analyzed in an automated manner.

At operation 818, the method 800 includes facilitating, by the processor, modification of the intent data based on the analysis. In at least an example embodiment, the list of similar sentences may be manually annotated after analyzing the list of similar sentences. The intent data may be updated after annotation of the one or more sentences in the list of similar sentences. Further, one or more sentences are removed from the data pool based on the updated intent data. The one or more sentences correspond to the annotated list of similar sentences. The method 800 ends at operation 818.

It shall be noted that one or more operations of the method 800 may be grouped together and performed in form of a single step, or one operation may have several sub-steps that may be performed in parallel or in sequential manner.

Various embodiments disclosed herein provide numerous advantages. The techniques disclosed herein suggest techniques for improving responses of automated conversational agents based on updating intent data using vector representations. The techniques disclosed herein suggest generation of a vector representation of a conversational input using an embedding model. The embedding model captures a semantic data and a syntactic data of the conversational input. The conversational input is mapped into vectors of real numbers based on the semantic data and the syntactic data. The vector representation may provide an efficient processing of textual data. More specifically, the techniques disclosed herein may facilitate analyzing of a list of similar sentences. The list of similar sentences is retrieved based on the vector representations. Further, the list of similar sentences includes one or more sentences of a data pool that are semantically matching to bait sentences generated by the annotators. The list of similar sentences with a feasible number of sentences may be examined manually and the intent data may be updated for improving the responses of the automated conversational agents.

The disclosed methods with reference to FIGS. 1 to 8, or one or more operations of the flow diagram 700 or 800 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), mobile communications, or other such communication means.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an apparatus, as described and depicted in FIG. 3A. A computer-readable medium may include a computer-readable storage medium that may be any media or means that can contain or store the instructions for use by or in connection with an instruction execution system, system, or device, such as a computer.

Although the present invention has been described with reference to specific exemplary embodiments, it is noted that various modifications and changes may be made to these embodiments without departing from the broad spirit and scope of the present invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 300 and its various components such as the processor 302, the memory 304, the I/O module 306, the communication module 308, and the centralized circuit system 310 may be enabled using software and/or using transistors, logic gates, and electrical circuits (for example, integrated circuit circuitry such as ASIC circuitry). Various embodiments of the present invention may include one or more computer programs stored or otherwise embodied on a computer-readable medium, wherein the computer programs are configured to cause a processor or computer to perform one or more operations (for example, operations explained herein with reference to FIGS. 7 and 8). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the present invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method, comprising:
   receiving, by a processor, a conversational input provided by a user;
   generating, by the processor, a vector representation of the conversational input;
   determining, by the processor, an intent data of the conversational input based on the vector representation;
   facilitating, by the processor, generation of a first set of sentences based on the intent data;
   accessing, by the processor, a second set of sentences from a data pool of sentences;
   generating, by the processor, a first set of vector representations and a second set of vector representations of the first set of sentences and the second set of sentences respectively, the first set of vector representations corresponding to the first set of sentences and the second set of vector representations corresponding to the second set of sentences;
   comparing, by the processor, the first set of vector representations and the second set of vector representations to retrieve a list of similar sentences, the list of similar sentences comprising one or more sentences from the second set of sentences semantically matching to the first set of sentences;
   providing, by the processor, the list of similar sentences for updating the intent data of an automated conversational agent;
   facilitating, by the processor, analysis of the list of similar sentences; and
   facilitating, by the processor, updating of the intent data based on the analysis wherein facilitating updating of the intent data comprises at least:
   adding a new intent;
   relabeling an existing intent;

splitting the existing intent into one or more categories; and
deleting the existing intent.

2. The method as claimed in claim 1, wherein generating the vector representation comprises:
capturing, by the processor, a semantic data and a syntactic data of the conversational input;
generating, by the processor, vectors of the semantic data and the syntactic data;
mapping, by the processor, the conversational input into the vectors; and
acquiring, by the processor, the vector representation upon mapping the conversational input.

3. The method as claimed in claim 2, wherein capturing the semantic data and the syntactic data comprises extracting, by the processor, the semantic data and the syntactic data using an embedding model.

4. The method as claimed in claim 3, further comprising:
training, by the processor, the embedding model using a conversation data, the conversation data corresponding to interactions between agents and users.

5. The method as claimed in claim 1, further comprising:
removing, by the processor, one or more sentences from the data pool of sentences based on the modified intent data; and
facilitating, by the processor, size reduction of the data pool of sentences upon removing the one or more sentences.

6. The method as claimed in claim 1, wherein facilitating analysis of the list of similar sentences comprises analyzing the list of similar sentences until a convergent point, the convergent point corresponding to end of the list of similar sentences.

7. The method as claimed in claim 1, wherein retrieving the list of similar sentences comprises:
determining, by the processor, similar vector representations between the first set of vector representations and the second set of vector representations using a similarity model;
extracting, by the processor, one or more sentences corresponding to the similar vector representations; and
storing, by the processor, the one or more sentences in the list of similar sentences.

8. The method as claimed in claim 1, wherein the data pool of sentences comprises at least one of:
an intent pool corresponding to an intent; and
a conversation data pool corresponding to interactions between agents and users.

9. An apparatus for updating intent data of an automated conversational agent, the apparatus comprising:
a memory comprising stored instructions; and
a processor configured to execute the stored instructions and thereby cause the apparatus to at least perform:
receiving a conversational input provided by a user;
generating a vector representation of the conversational input;
determining an intent data of the conversational input based on the vector representation;
facilitating generation of a first set of sentences based on the intent data;
accessing a second set of sentences from a data pool of sentences;
generating a first set of vector representations and a second set of vector representations of the first set of sentences and the second set of sentences respectively, the first set of vector representations corresponding to the first set of sentences and the second set of vector representations corresponding to the second set of sentences;
comparing the first set of vector representations and the second set of vector representations to retrieve a list of similar sentences, the list of similar sentences comprising one or more sentences from the second set of sentences semantically matching to the first set of sentences;
providing the list of similar sentences for updating the intent data of the automated conversational agent;
facilitating analysis of the list of similar sentences; and
facilitating updating of the intent data based on the analysis, wherein for facilitating the updating of the intent data, the apparatus is further caused at least in part to perform:
adding a new intent;
relabeling an existing intent;
splitting the existing intent into one or more categories; and
deleting the existing intent.

10. The apparatus as claimed in claim 9, wherein for generating the vector representation, the apparatus is further caused at least in part to perform:
capturing a semantic data and a syntactic data of the conversational input;
generating vectors of the semantic data and the syntactic data;
mapping the conversational input into the vectors; and
acquiring the vector representation upon mapping the conversational input.

11. The apparatus as claimed in claim 10, wherein for capturing the semantic data and the syntactic data, the apparatus is caused to at least perform extracting the semantic data and the syntactic data using an embedding model, the embedding model being trained using a conversation data corresponding to interactions between agents and users.

12. The apparatus as claimed in claim 9, wherein the apparatus is further caused to at least perform:
removing one or more sentences from the data pool of sentences based on the modified intent data; and
facilitating size reduction of the data pool of sentences upon removing the one or more sentences.

13. The apparatus as claimed in claim 9, wherein for facilitating analysis of the list of similar sentences, the apparatus is further caused at least in part to analyze the list of similar sentences until a convergent point, the convergent point corresponding to end of the list of similar sentences.

14. The apparatus as claimed in claim 9, wherein for retrieving the list of similar sentences the apparatus is further caused at least in part to perform:
determining similar vector representations between the first set of vector representations and the second set of vector representations using a similarity model;
extracting one or more sentences corresponding to the similar vector representations; and
storing the one or more sentences in the list of similar sentences.

15. A method for updating intent data of an automated conversational agent, the method comprising:
receiving, by a processor, a conversational input provided by a user;
generating, by the processor, a vector representation of the conversational input;
determining, by the processor, an intent data of the conversational input based on the vector representation;

facilitating, by the processor, generation of a first set of sentences based on the intent data;

accessing, by the processor, a second set of sentences from a data pool of sentences;

generating, by the processor, a first set of vector representations and a second set of vector representations of the first set of sentences and the second set of sentences respectively, the first set of vector representations corresponding to the first set of sentences and the second set of vector representations corresponding to the second set of sentences;

comparing, by the processor, the first set of vector representations and the second set of vector representations to retrieve a list of similar sentences, the list of similar sentences comprising one or more sentences from the second set of sentences semantically matching to the first set of sentences;

facilitating, by the processor, analysis of the list of similar sentences; and facilitating, by the processor, modification of the intent data based on the analysis, wherein facilitating modification of the intent data comprises at least:
adding a new intent;
relabeling an existing intent;
splitting the existing intent into one or more categories; and
deleting the existing intent.

16. The method as claimed in claim 15, further comprising:

removing, by the processor, one or more sentences from the data pool based on the modified intent data; and facilitating, by the processor, size reduction of the data pool upon removing the one or more sentences.

* * * * *